United States Patent [19]
Sanz

[11] Patent Number: 6,065,523
[45] Date of Patent: *May 23, 2000

[54] MODULAR AIRCRAFT WINDOW UNIT INCLUDING A ROMAN SHADE HAVING SCISSORED LEVERS

[75] Inventor: Eduardo Sanz, San Antonio, Tex.

[73] Assignee: MSA Aircraft Products LTD, San Antonio, Tex.

[ * ] Notice: This patent is subject to a terminal disclaimer.

[21] Appl. No.: 09/154,682

[22] Filed: Sep. 17, 1998

Related U.S. Application Data

[63] Continuation-in-part of application No. 08/868,183, Jun. 3, 1997, Pat. No. 5,954,109, which is a continuation-in-part of application No. 08/533,168, Sep. 25, 1995, Pat. No. 5,662,152.

[51] Int. Cl.$^7$ ...................................................... E06B 9/30
[52] U.S. Cl. .................................. 160/84.02; 160/168.1 P
[58] Field of Search ............................. 160/84.02, 84.06, 160/84.04, 84.01, 107, 172 R, 168.1 P, 90, 98, 188, 310

[56] References Cited

U.S. PATENT DOCUMENTS

| | | |
|---|---|---|
| 4,679,610 | 7/1987 | Spraggins . |
| 4,852,627 | 8/1989 | Peterson et al. ..................... 160/84.02 |
| 4,945,969 | 8/1990 | Schnebly et al. ................ 160/273.1 X |
| 4,998,576 | 3/1991 | Moreno . |
| 5,082,043 | 1/1992 | Moreno . |

*Primary Examiner*—David M. Purol
*Attorney, Agent, or Firm*—Jackson Walker, LLP

[57] ABSTRACT

The present invention relates to a modular window unit for an aircraft comprising a nonopaque lens and a reveal, the reveal joining the lens, as well as a shade comprising a multiplicity of discrete elongated panels, each panel cooperating with one another and being movable between an open and a closed position. The panels lay one next to the other to substantially cover the lens when the window shade is closed and, in an open position, lay stacked atop each other to substantially uncover the lens. Electric motors are provided for moving the panels of the shade between the open and closed positions.

25 Claims, 13 Drawing Sheets

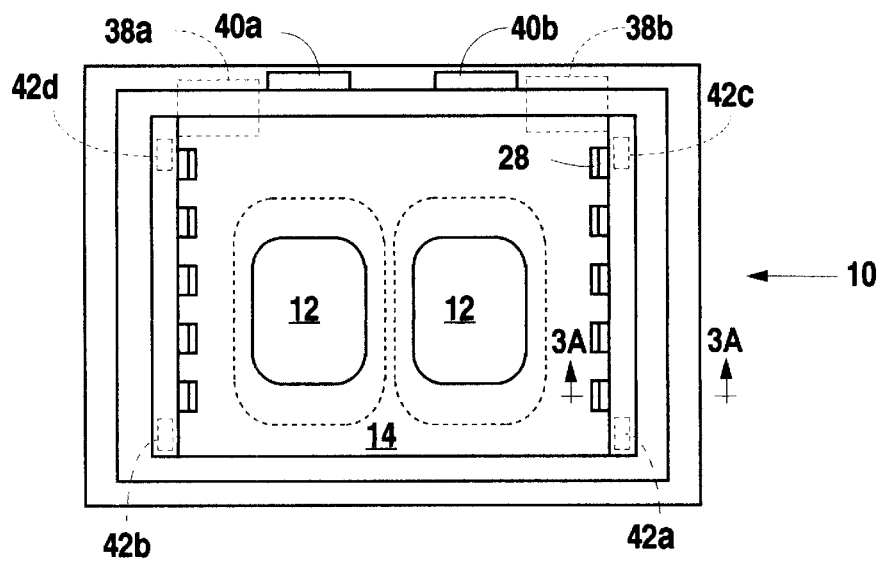
Fig 3
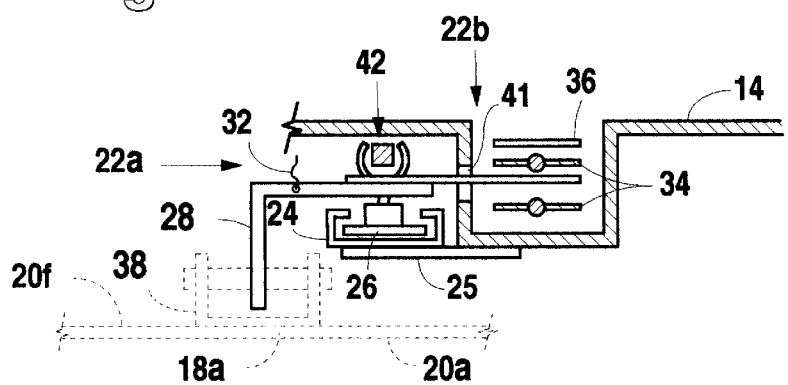
Fig. 3A
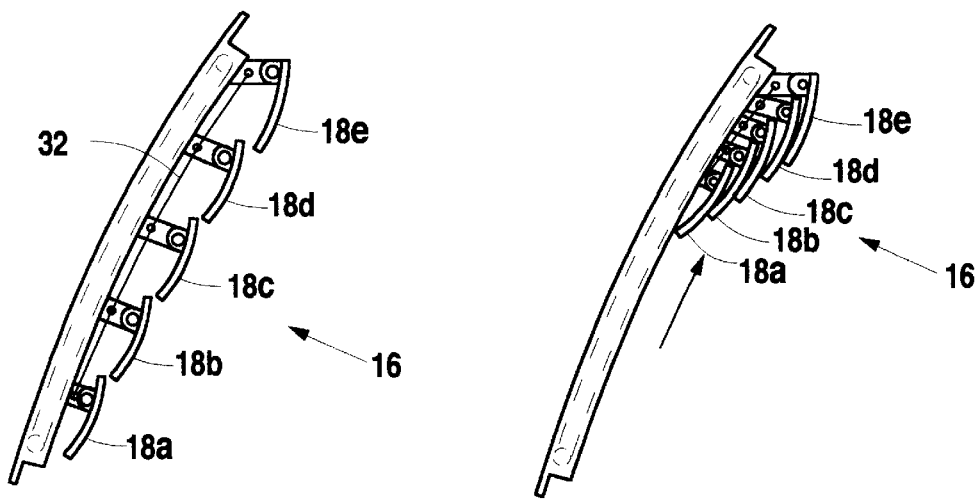
Fig. 4
Fig. 5

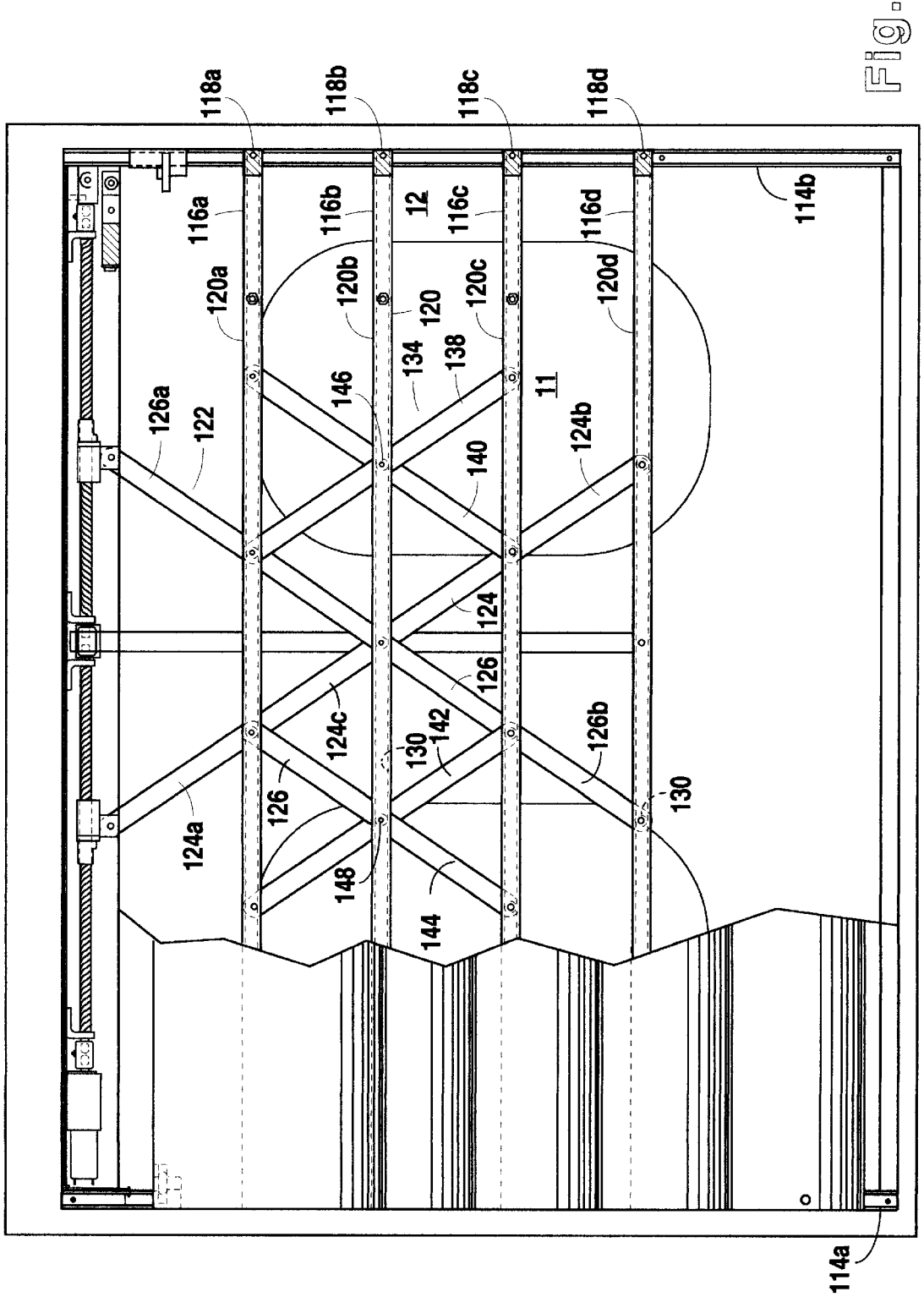

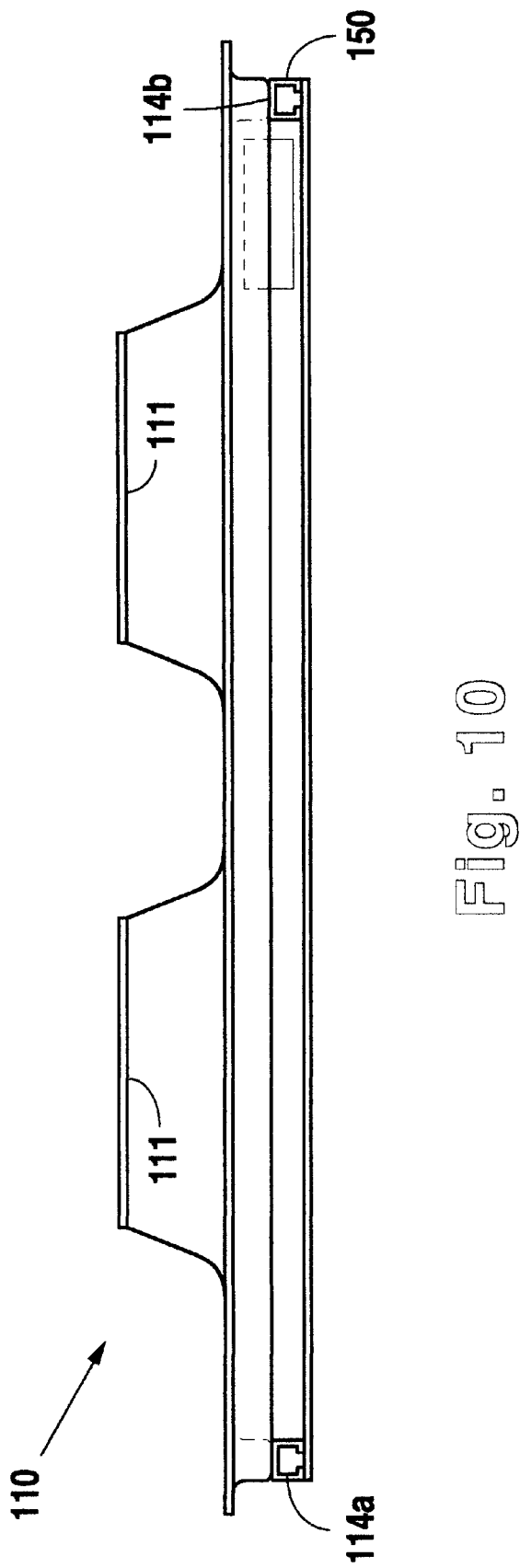

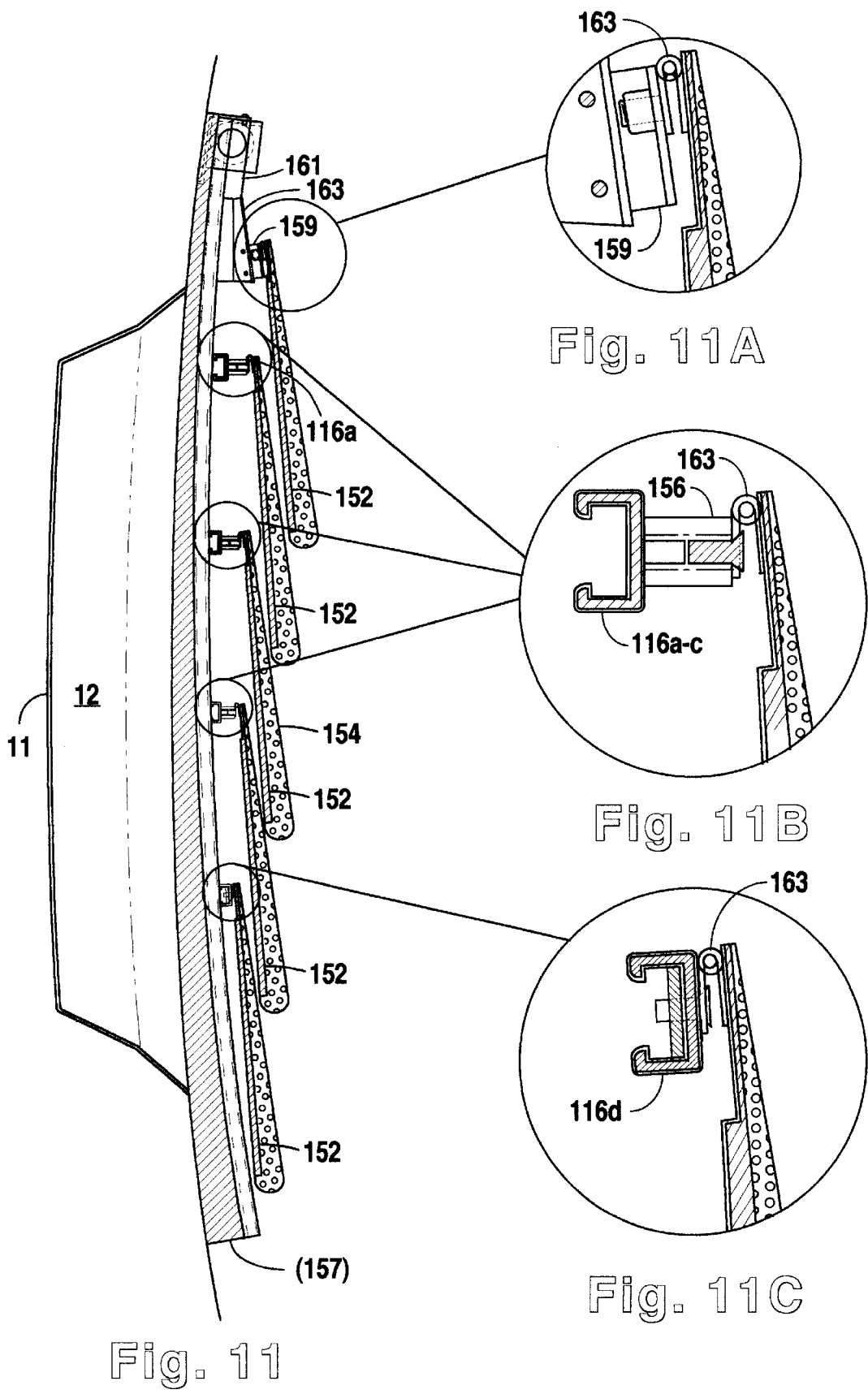

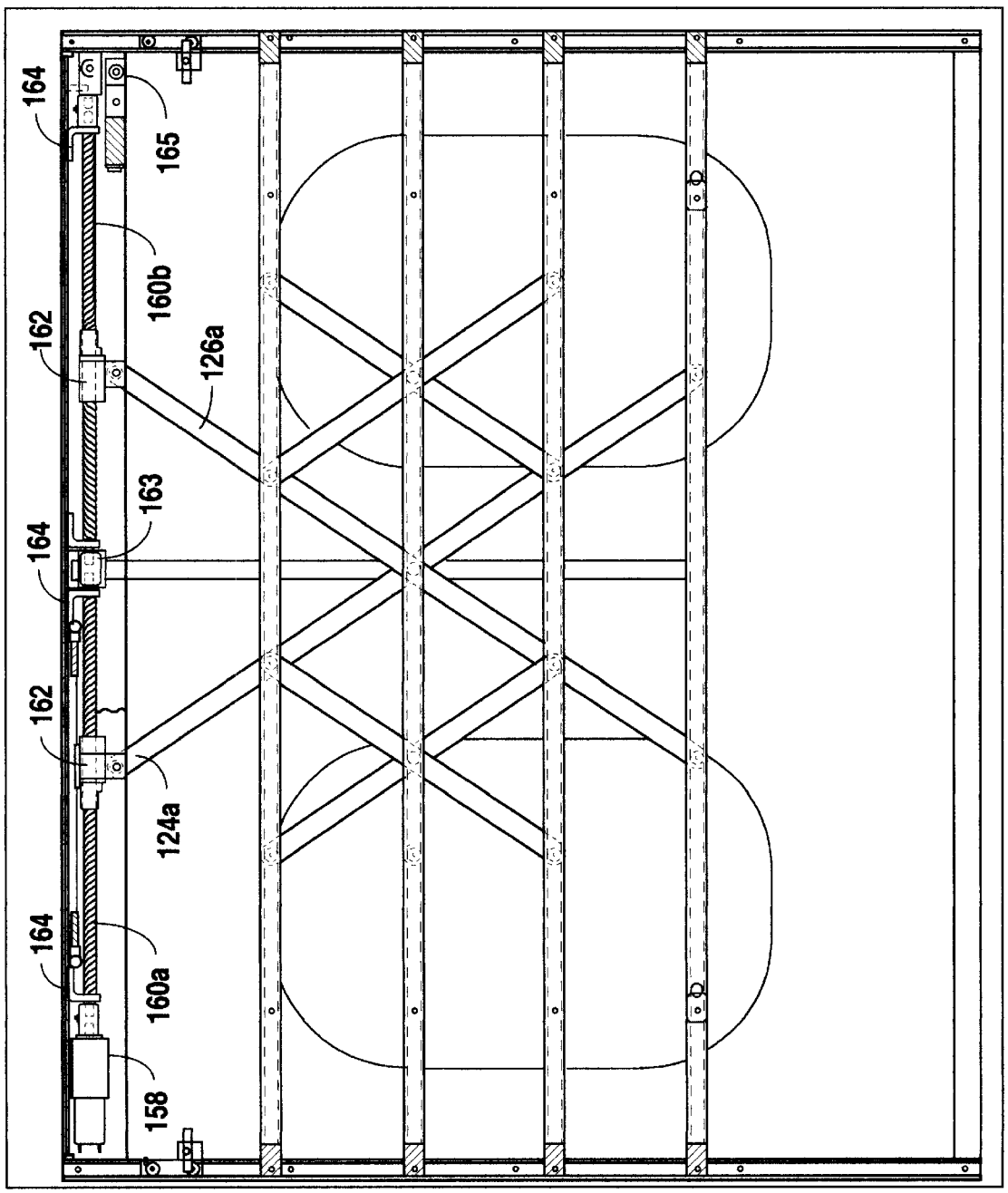

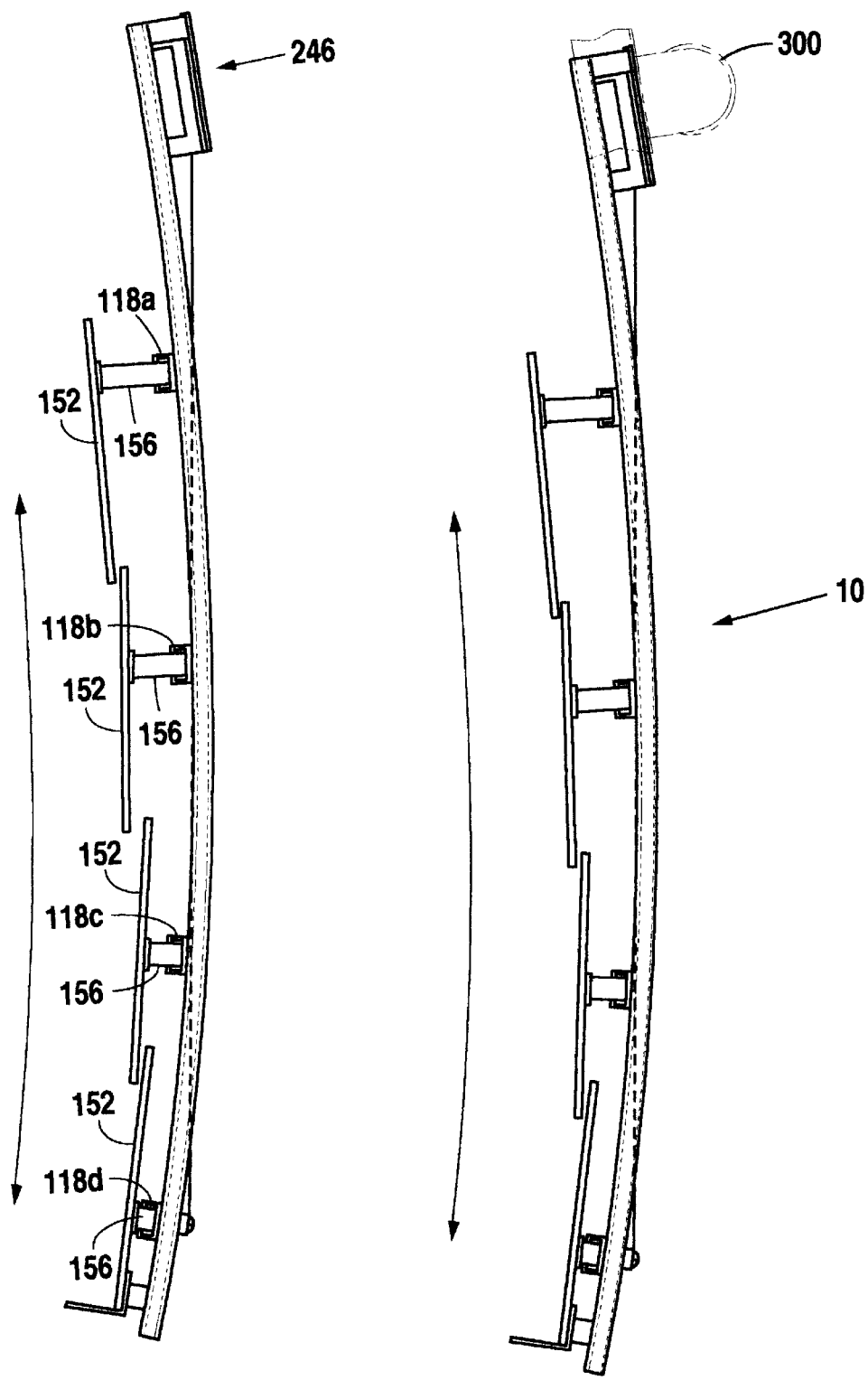

MODULAR AIRCRAFT WINDOW UNIT INCLUDING A ROMAN SHADE HAVING SCISSORED LEVERS

This application is a continuation-in-part of U.S. application Ser. No. 08/868,183 filed Jun. 3, 1997, now U.S. Pat. No. 5,954,109 which, in turn, is a continuation-in-part of U.S. application Ser. No. 08/533,168 filed Sep. 25, 1995, now U.S. Pat. No. 5,662,152.

FIELD OF THE INVENTION

A modular aircraft window unit having a shade comprised of a multiple of separate panels with a mechanism for raising and lowering a window shade; more specifically, a pair of scissored levers engaging a drive means at one end and a shade rail for raising and lowering a window shade.

BACKGROUND OF THE INVENTION

Most aircraft windows have shades to control the amount of light entering the interior of the aircraft. The simplest aircraft window is typically comprised of retractable shade material with a rail along the bottom. The rail typically has a tab that can be gripped by the passenger for sliding vertically between a closed (usually down) position, in which the window is covered, and an open (usually up) position, allowing light into the cabin.

However, many aircraft, including typically those in the executive jet aircraft class, have rather expensively appointed interiors, including custom designed windows. Sometimes these windows are electric, sometimes manual, or sometimes electric with manual overdrives. These custom interiors also may feature modular windows with shades located between an inner lens and an outer lens and activated by a mechanical or electrical mechanism operated by the passenger. These modular windows, often built by aftermarket supply firms and fitted at modification centers ("mod centers"), have shades made of a variety of materials; but typically, the materials are collapsible between an extended (down or closed) position and a retracted (up or open) position. An example of such a modular window unit with a retractable shade may be found in U.S. Pat. No. 4,679,610 (Spraggins, 1987). The '610 patent features a modular, self-contained window unit having two panes of transparent, impact-resistant glass secured by a frame and having a shade made of a collapsible sheet movable between an open and closed position.

Shade materials are typically pleated and collapsible with sufficient rigidity to maintain their shape, form, and uniformity. Manufacturers of present window shade material include Hunter-Douglas. However, shade material suppliers are limited in the styles and color section which can be provided.

Advantages exist in being able to use any upholstery material or fabric. The use of any upholstery material or other fabric increases the design opportunity available to the interior designer for coordinating the colors and textures of the interior of the aircraft to the window shade material. Thus, greater flexibility is provided in an aircraft window shade which can use any flexible fabric, rather than the limited selection of presently available shade materials.

Some of the present aircraft windows utilize a "Roman shade", that is, one having horizontal pleats. These, however, utilize a bar or rod, or a series of bars or rods, extending horizontally across the windows. From these bars or rods is a draped fabric, typically backed with thin foam (such as Insulite). The bars or rods are raised and lowered, deploying fabric as they are lowered and gathering it up as they are raised. Typically, the fabric is a single sheet with multiple pleats and multiple bars or rods. It does not tend to hold its shape well, tends to be heavy, and bulky, especially when the shade is in a raised or up position. Further, it has a limited ability to block out heat, light, and sound, even when in a down or closed position.

Aesthetics are a very important consideration in the design of aircraft interiors, including windows, especially for private or corporate jets. For example, in the aforementioned shade, it is more attractive to conceal as much of the mechanical mechanism which raises and lowers the shades as possible. Some mechanical window shades utilize chains, cables, or the like to raise and lower the shade, which means are often visible to the passenger, especially if the passenger looks through the window at an oblique angle.

Moreover, when the shade to be raised and/or lowered is a "Roman shade" or a shade made of discreet horizontally segmented panels, it is desirable that, when such shade is raised or lowered, the separation between the pleats (or panels) remains proportional. That is, when the shade is in a down position (lowered or closed), the pleats (or panels) are a certain distance apart. As the shade is raised, it is aesthetically desirable for the distance between the adjacent pleats (or panels) to decrease proportionately rather than, say, the lowest pleat collapsed to the one just above it and have a successive piling up of the pleats (or panels) as the shade is raised. It is also important in a shade that the pleats (or panels) be kept parallel to one another and perpendicular to the edges of the window. In other words, as the shade is raised and lowered, it is important that the pleats (or panels) be kept parallel and the proportional separation of adjacent pleats (or panels) decrease and increase proportionately as the shade is raised and lowered. Last, it is important to have the ability to use non-opaque panels as pleats (the panels typically being covered with fabric). Non-opaque panels especially assist in blocking visible and ultraviolet light for further passenger comfort. Such panels also help keep the fabric neater and straighter during window shade operation.

SUMMARY OF THE INVENTION

Applicant seeks to expand the design options for aircraft interior designers in providing a window unit having a shade capable of utilizing upholstery material or other flexible fabric material.

This and other objects are provided for in a window unit having a shade consisting of a series of flat or curved, rigid, typically composite panels covered with fabric and installed on the reveal in a manner that allows them to move between an open and closed position, the closed position with the panels stacked one behind the other, the open position allowing them to lay flat, one next to the other. When the shade is in an extended or closed position (shade down), it offers protection against light, noise, and fabric collapse.

The panels of the shade are typically upholstered by the Mod center and, therefore, obtain design flexibility previously unavailable.

The entire window unit having Applicant's unique shade is typically manufactured in a self-contained, easy-to-install assembly.

A further object of this invention is to provide for, in an aircraft window, a shade that is attractive; and a segmented shade that maintains proportional separation as the shade is raised or lowered while keeping the pleats parallel to one another and perpendicular to the edges of a window frame, which allows the use of panels to separate pleats and for increased light blockage.

These and other objects are provided for in a window for an aircraft, the window comprising a generally rectangular frame with side tracks; a multiplicity of shade rails with separate shade sections attached thereto, the shade rails engaging, through the removed ends thereof, the side tracks of the frame; drive means; a pair of scissored levers having first and second ends with a body portion therebetween, the body portion engaged to at least some of the shade rails, the levers of said pair with the first ends engaging said drive means, the second ends engaging at least one of said multiplicity of shade rails, for moving between an open and a closed position, the open position with the shade rails separated in the closed position with the shade rails adjacent to one another.

These and other objects are provided for in the window described above wherein the body and at least one end of said levers of said scissored pairs slidably engages each of said multiplicity of shade rails and further including a multiplicity of shade panels for engaging the shade rails as well as means for maintaining alignment of the shade rails so that they are parallel to one another and perpendicular to the side tracks.

These and other objects are further provided for in the aircraft window set forth above which further includes two sets of scissored levers, each set having a pair of scissored levers which slidably engage at least some of the slide rails and further having, as a drive means thereof, an electric motor driving a lead screw, the lead screw engaging the first end of said pair of said scissored drive levers.

BRIEF DESCRIPTION OF THE DRAWINGS

FIG. 3 is a front elevational view of Applicant's modular window unit with the shade panels partially removed to illustrate some of the interior mechanism.

FIG. 3A is a detailed view of the track mechanism.

FIG. 4 is a side elevational view of Applicant's modular window unit with the shade in the down position.

FIG. 5 is a side elevational view of applicant's modular window unit with the shade in the up position.

FIG. 9 is a front elevational view of Applicant's mechanism for raising and lowering a shade of an aircraft window.

FIG. 10 is a top elevational view of Applicant's mechanism for raising and lowering the shade of an aircraft window.

FIG. 11 is a side elevational view of Applicant's mechanism for raising and lowering the shade of an aircraft window.

FIGS. 11A, 11B, and 11C are exploded, side elevational views of the shade rail shade panel connections of Applicant's invention.

FIG. 12 is a front elevational view of Applicant's invention showing the motor and related structures.

FIG. 14 is a side elevational view of the window of Applicant's present invention.

FIG. 19 is a side elevational view of the motor attached to the modular window unit of applicant's present invention.

DETAILED DESCRIPTION OF THE PREFERRED EMBODIMENT

Applicant provides a modular window unit (10) which incorporates a typically transparent lens (12) supported and typically surrounded by a reveal (14) which acts as the body of the window unit and typically is made from fiberglass or a composite material. Applicant's modular window unit (10) includes a shade (16) movable between a closed or down position (FIG. 2) and an open or up position (FIG. 3) or any position therebetween (see FIG. 1, partially open).

Figure 6A:
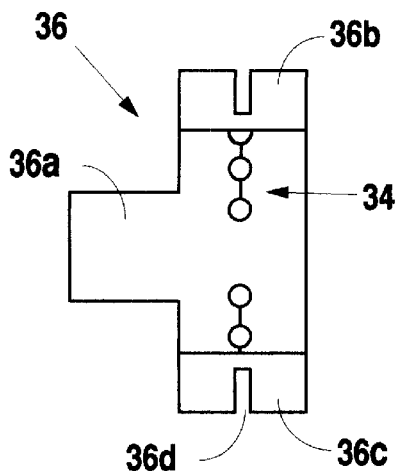
FIGS. 6A and 6B are front and side elevational views, respectively, of the belt engagement member of the drive mechanism of the shade of Applicant's modular window unit.
Figure 6B:
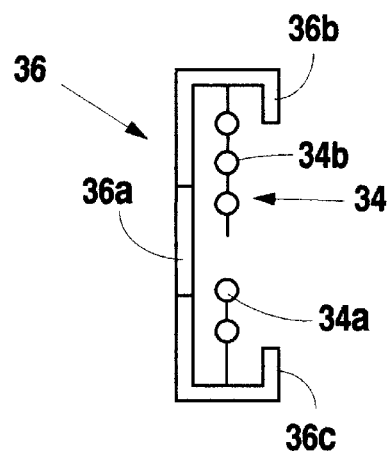
Figure 7:
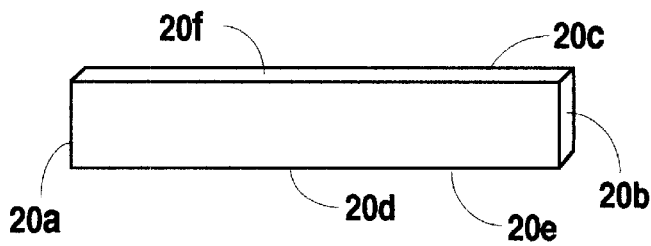
FIG. 7 is a perspective view from the front of a panel of Applicant's shade.

With reference now to FIGS. 1–8, it is seen that the modular unit of Applicant's invention provides for a unique shade having a multiplicity of panels, here, by way of example and not limitation, five in number and designated as panels (18a) through (18d), movable, as well as a fixed or valence panel (18e). With reference to FIG. 7, each panel is seen to have the removed ends (20a) and (20b), a top edge (20c), a bottom edge (20d), a front surface (20e), and a rear surface (20f). The panels engage one another and also engage the reveal (14) through guide means (22a), the function of guide means (22a) being to maintain proper alignment among the panels and with the remainder of the modular unit, more specifically, the reveal (14). Panels (18a) through (18d) (movable) also are engaged to drive means (22b) as is more specifically illustrated in FIGS. 6A and 6B. Drive means (22b) is powered typically by a pair of motors (38a) and (38b) whose speed is controlled through a pair of speed control modules (40a) and (40b).

Figure 1:
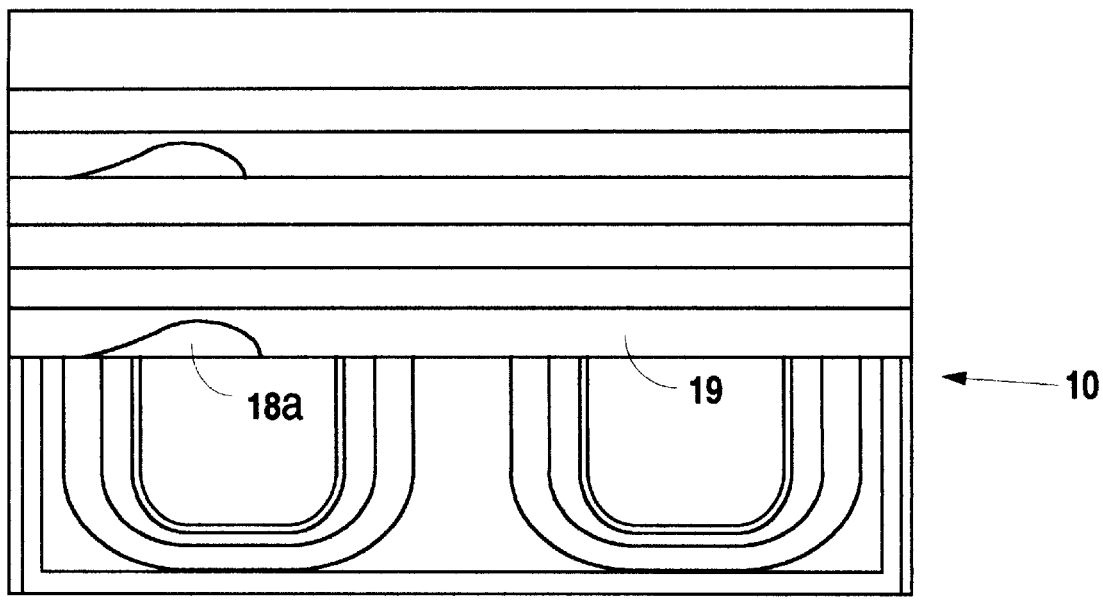
FIG. 1 is a front elevational view of Applicant's modular window unit featuring the pleated shade.
Figure 2:
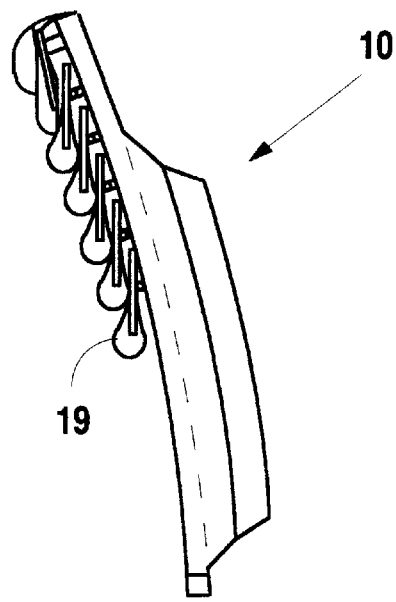
FIG. 2 is a side elevational view of Applicant's modular window unit.

With reference to more details in the FIGS., it is noted that FIGS. 1 through 3 illustrate shade (16) comprising a multiplicity of panels, including a plurality of movable panels (18a) through (18d) and a fixed panel (18e) attached horizontally along the top of the reveal (14) in a fixed position. It is further seen that each of the panels (movable as well as fixed) has draped over the exterior a fabric (19), typically cloth, typically an upholstery-type cloth fabric, draped over the panel itself. The panel itself is typically flat or slightly curved; providing a panel slightly curved in cross section (see FIG. 4) gives some rigidity or stiffness to the panels. The panels are typically comprised of P.V.C. foam core with fiberglass skins and are typically about 0.12 inch thick. The panels stretch horizontally across the windows to cover the lens (12) as well as substantially cover the reveal (14). The panels could cover one, two, three, or more lenses. It is noted, specifically with reference to FIGS. 2, 4, and 5, how the panels, in an up or retracted position, stack one beneath the other. In a full down position (see FIG. 4), the panels typically lay with their top edge of one panel just adjacent to or just beneath the bottom edge of the panel below it. In a full down (shade closed) position, bottom edge (22d) of panel (18a) will typically shut off view of the reveal (14) and/or lens (12) from the interior of the aircraft. In a position between full down or full up, there is partially overlap of panels, as may be appreciated with reference to FIG. 2.

It is noted with reference to FIGS. 1 and 2, especially FIG. 2, how upholstery or cloth (19) tends to drape over the panel just below it to give a pleasing pleated effect. Upholstery (19) may be attached to panels (18a) through (18e) by gluing, fastening with clips along the top edge of the panels, or other means.

As the panels move between the up and the down position, they must maintain alignment with one another as well as alignment with the reveal. Proper alignment requires that the moving panels maintain a parallel alignment with one another as well as with the top and bottom edges of the window unit. This is done by incorporating a guide mechanism which allows the movable panels to cooperate with the reveal and each other to maintain such an alignment.

Figure 8:
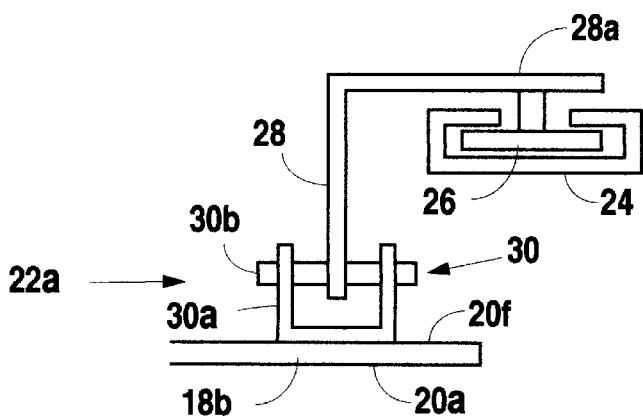
FIG. 8 is a top elevational view of the guide (tracking) mechanism of Applicant's modular window unit.

FIG. 8 reveals details of guide means (22a). Each of the movable panels will utilize guide means on each end. Here, reference is made (for the sake of example) to panel end (20a) of movable panel (18b). It is seen in FIG. 8 that, attached to rear surface (20f) of panel end (20b) of panel (18b) is a panel support member mounting means (30) which is comprised of a U-shaped bracket (30a) and a pin (30b) extending between the two opposite arms of the "U" of U-shaped bracket (30a). Articulating on pin (30b) is panel support member (28) typically L-shaped and made of aluminum. Removed end (28a) of panel support member (28) has attached thereto nylon slider (26), which here is seen to be T-shaped, and engages track (24), typically channel aluminum, which is attached to reveal (14) as is more clearly illustrated with reference to FIG. 6A, by attachment plate (25). The slider rides in the track as the shade moves, keeping the panels from wandering laterally. It is to be pointed out that pin (30b) allows the articulation of panel support member (128) such that the panels can pivot as they ride over the curved surface of the track (see FIG. 2).

Each end of each movable panel is provided with this guide means. Included on each panel support member (28) of the movable panels is a length of string (32) (see FIG. 6A) which attaches to the top of panel support member (28) and to the bottom of the adjacent panel support member just above. The strings are equal in length and will control the distance between adjacent panels when the shade is in the open position. See FIG. 4 with reference to the manner in which strings allow for proper separation of one shade with respect to the other.

Applicant also provides for a drive mechanism or drive means (22b) to power the windows between the up and down position or to stop at any place therebetween. With reference to FIGS. 1 and 6A, it is seen that the drive mechanism is provided through engagement at removed panel ends (20a) and (20b) of the lowest panel, here movable panel (18a), of a belt engagement plate (36). More specifically, belt engagement plate (36) has a leg (36a) for extending through a slot (41) in the walls of the reveal (14), here the walls of the reveal (14) are convoluted to incorporate applicant's drive means (see FIG. 6A) and belt. The leg of belt engagement plate (36) attaches to panel support member (28) at or near the removed end thereof. Belt engagement plate (36) also has, opposite the leg, removed arms (36b) and (36c) which are J-shaped and include slots (36d). The slots are dimensioned for receipt of a belt (34) therein, but are sufficiently narrow to capture balls (34a) spaced along chain (34b) of belt (34) such that movement of the belt is transmitted to belt engagement member (36). Further, it is seen with reference to FIGS. 6A and 6B how the belt ends are captured in the slots between arms (36b) and (36c) of belt engagement member (36). The belt is driven by a gear (not shown) which is attached to the output shafts of the electric motors, here typically two motors, as illustrated at (38a) and (38b). The motors are energized by the electrical system of the aircraft, through speed control modules (40a) and (40b) and passenger-accessible switches. Suitable motors may be purchased from Micromotors of St. Petersburg, Fla., as Model No. 2233F030. Suitable speed control modules are manufactured by Total Texas Technologies as part No. MSA-08B.

Magnetic limit switches provide for a means of cutting off the electric motors when the panel ends reach the up or down limit. More specifically, magnetic switches (42a) through (42d) are connected to the motors to shut off and deenergize the motors when shade (18a) reaches the lower position—magnetic switch (142a) to motor (38a) and magnetic switch (42b) to motor (38b)—or the upper position—magnetic switch (42c) to motor (38b) and magnetic switch (42d) to motor (38a). The magnetic limit switches are mounted to the reveal (14) and wired to the proper motor. It is seen that, if one end lags slightly lower than the other at the lower limit of travel, the magnetic switch will shut off the motor for the lower end earlier than the other, allowing for a self-leveling effect. Going up, the lower end motor will stay on longer to let the lower end "catch up". When the shade is first installed, the technician will adjust the speed control module so the motors raise and lower the shades at the same rate, thus tending to maintain proper shade alignment. Nonetheless, should the speed drift somewhat or other events occur, the use of two motors with independent sets of limit switches allow for self-leveling.

Applicant's novel window may be used in aircraft as well as any suitable and appropriate environment. Recreational vehicles, yachts, and trains may also take advantage of the improvements and utility offered by applicant's design.

When the shade is in the full up position, the panels are stacked, suspended generally vertically as indicated in FIG. 5, with the outer panels covering at least half or more of the surfaces of the panels just below (see also FIG. 2). When the motors are energized, the entire stack of movable panels (18a) through (18d) will begin to move down until the string between (18e) and (18d) is taut, at which time panel (18d) will be deployed. Continued movement downward from there will subsequently deploy panels (18c), (18b), and finally (18a) will reach its limit switch at about the time it is fully deployed beneath panel (18b). The use of a string, along with a curved track and the articulating pin (30b), allows for the movement of the shade along a curved path. That is, the profile of the window unit is typically curved (as may be appreciated with reference to FIG. 2) to correspond to the curve of the interior of the aircraft cabin.

It should be appreciated that each panel is suspended and allowed to hang generally vertically on pins (30b), whether the shade is up or down or in between. Further, these pins may be of the quick-release type or a ball-lock type pin. The advantage of such a pin is the ease of removal, especially important as it is anticipated that a unit with uncovered panels will be shipped to Mod centers for the Mod center to cover and install. The less work (and ease) in installing the panels (after covering) by the Mod center, the more attractive the unit is. A ball-lock type pin may be used to install the panels without the use of tools.

When the shade is in a full down position and is activated, the drive means will act on panel (118a) and retract it until it engages the panel just above it—panel (18b). Further retraction will allow the two panels to move as a unit and subsequently pick up panels (18c) and (18d) as they move to the full up position.

It is noted that Applicant's unique shade may be raised manually by mechanical actuation. Means of mechanically raising shades are described in Applicant's earlier patents, including U.S. Pat. Nos. 4,679,610; 4,998,576; and 5,082,043, which patents are incorporated herein by reference. Additional applications of Applicant's window include military vehicles, including light armor vehicles. Indeed, Applicant's unique panels may be constructed of bulletproof and/or bullet-resistant Kevlar and/or fiberglass composites.

The surfaces (outer or inner) of Applicant's panels may be covered flush with fabric, leather, wood grain finish, paint, mirror surfaces (such as polished aluminum or the like), or other suitable material. Applicant's panels may have a coating on the outside surface comprising a metallic sheet or the panel itself may be metallized or have a reflective coating to help reflect intense light and/or radiation. The panel may have a soft coating on the inside of the shade. The core of the panel itself may be made of graphite or a carbon/graphite composite. Panels may be made of a graphite or phenolic skin on an inboard side of a honeycomb core, with a polished aluminum skin on the outside. Such a panel would help prevent or minimize light flash and heat from an atomic or nuclear blast, especially when fitted in an AWAC (Airborne Command Post).

Other appropriate materials of which panels may be constructed include NOMEX® or a NOMEX®/felt composite or honeycomb material (with or without skin) which is light, strong, and sufficiently fire resistant to comply with most aircraft regulations and specifications.

With reference to FIGS. 9–11, it is seen that, in an alternate preferred embodiment, Applicant provides an aircraft window (10) having a generally rectangular frame or body (12), typically made of fiberglass or a composite material which has openings defining windows (11) therein. On either side of the frame or body, or as a part thereof, there are attached side tracks or rails (114a) and (114b) which will guide the shade as it is raised and lowered between an open and closed position. The side rails help maintain proper alignment and tracking for the shade as further set forth below.

Extending between the side rails (114a) and (114b) are a multiplicity of shade rails (116a), (116b), (116c), and (116d). The shade rails are rigid, linear members having ends (118a), (118b), (118c), and (118d) at the removed ends of bodies (120a), (120b), (120c), and (120d). The removed ends of the shade rails slidably engage side rails (114a) and (114b) as the shade rails move between an open and closed position.

Operating on and engaging shade rails (116a)–(116d) are a pair of scissored levers (122), the pair having a first lever (124), the first lever having a first end (124a), a second end (124b), and a body (124c) between the first end and the second end. A second lever (126) of the lever pair (122) (and engaging lever (124)) has a first end (126a), a second end (126b), and a body (126c). Sliders (130) are used to engage each of the levers (124) and (126) with the back of shade rails (116a)–(116d) as set forth in FIGS. 9 and 9A, it being noted that the pair of scissored levers (122) articulate with one another on a bushing or pin (132) as designated in FIG. 9A. Pin (132) functions to engage both levers (124) and (126) so they articulate with one another and also to slidably engage, through use of slider (130), the two levers of lever pair (122) with the rear of shade rail (116b). Further, it is seen that sliders (130) allow slidable engagement with various points on the bodies and second ends of levers (124) and (126) with the rear surfaces of shade rails (116a)–(116d).

Figure 9A:
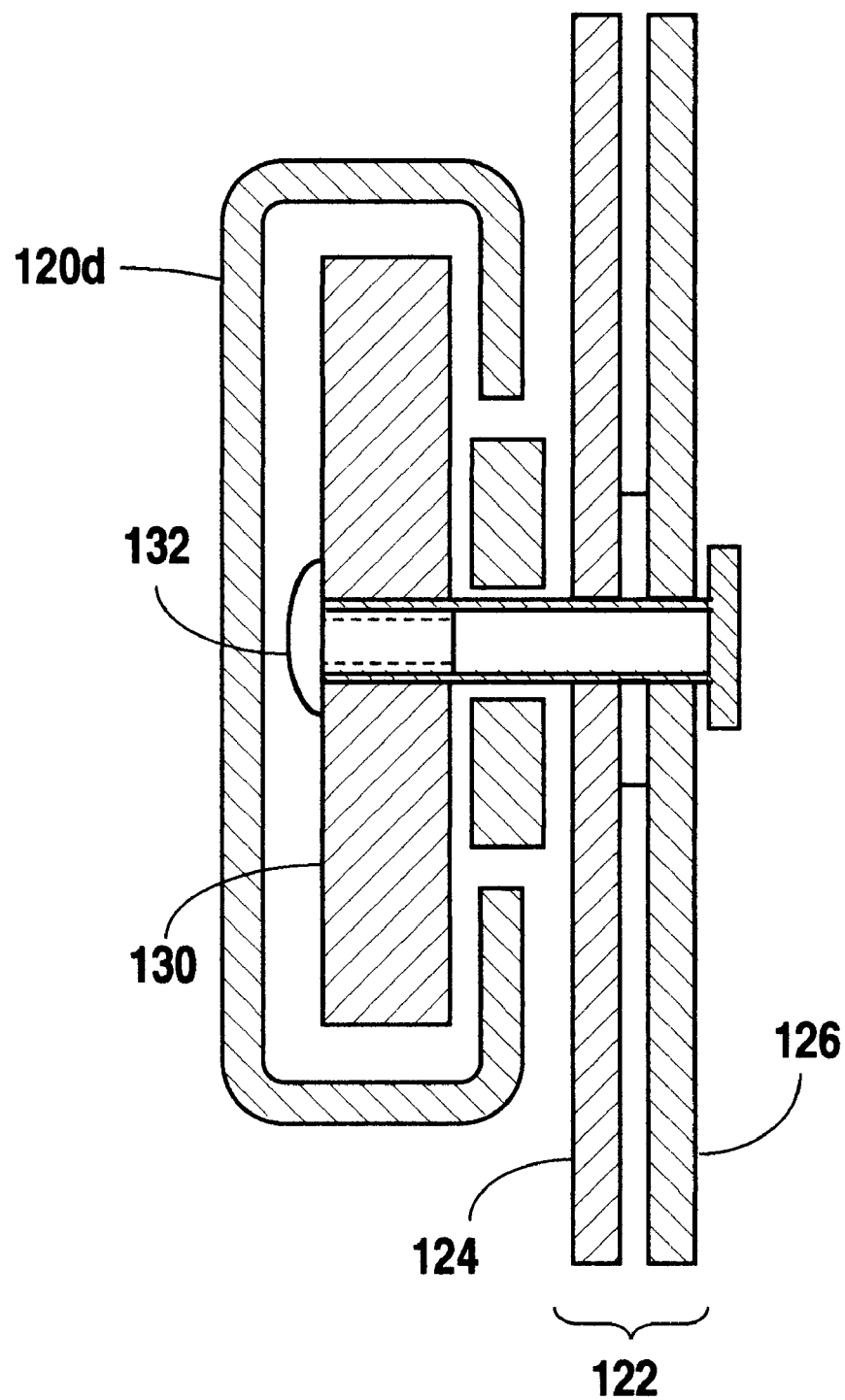
FIG. 9A is a detailed view of the slider and shade rail structure.

However, with reference to FIG. 9, it is further noted that there are, engaging the shade rails, a first pair of alignment levers (134) and a second pair of alignment levers (136). The first pair of alignment levers is comprised of a first lever (138) and a second lever (140). The second pair of alignment levers is comprised of a first lever (142) and a second lever (144). First pair of alignment levers (134) articulate at pin (146) and there have a slider (130) which functions to slidably engage the pair to the rear of shade rail (116b) and maintains the first lever (138) and second lever (140) in pivoting engagement (in the same fashion as set forth in FIG. 9A). Likewise, first lever (142) and second lever (144) of second pair of alignment levers (136) articulate at pin (148) and engage the rear of shade rail (116b) by use of another slider (130); pin and slider function to slidably engage the pair of second alignment levers (136) with the rear of the shade rail (116b) as well as to pivotally engage first lever (142) and second lever (144) of the second pair of alignment levers. Note, however, that both pairs of alignment levers, at their removed ends, engage, through the use of sliders (130) and shade rails (116a) and (116c). The use of such paired, scissored alignment levers as set forth here helps the mechanism to maintain the shade rails in parallel alignment with one another during the raising and lowering of the shade between an open and a closed position and keeps them separated as they close.

Further details of applicant's mechanism can be seen with reference to FIG. 10. More specifically, side rails (114a) and (114b) are seen to be comprised of generally C-shaped channels (150). A similar C-shaped channel is used for the shade rails (see FIG. 9A). In both cases, sliders (130) fit within the "C" and typically consist of nylon disks appropriately dimensioned. The nylon disks used in conjunction with the C-shaped aluminum shade rails and side rails allow for ease of movement. The use of this scissored lever drive system eliminates the need for a chain drive to raise and lower the shade rails.

Additional details of applicant's invention can be seen with reference to FIGS. 9 and 11. More specifically, it is seen that applicant provides a multiplicity of shade panels (152), each one attachable to a shade rail along the upper surface of the shade panel. The shade panel may be formed from a nonopaque rigid or flexible material. The use of PVC with a foam core approximately 1/16" to 1/8" thick has proved to be effective. The shade panel may be draped with a shade fabric (154) in any choice of color or pattern and material which would be suitable to the decor of the aircraft interior. Sometimes, shade panels (152) with shade fabric (154) thereon engage, along the upper surface, the shade rails through the use of standoffs (156) staggered in length to allow the panels to properly cluster when the shade is closed. The panels are easily removed from their respective shade rails by toolless snaps, Velcro®, or other fasteners known in the art. A spacer (157), tapered or untapered, may be used between the frame or body and the side rails to set off the shade or give the shade an appropriate position with respect to the aircraft interior. A floater rail (159) suspended on a card (161) may be used, attaching to the side rails through the use of a bracket (163). This rail does not attach to any lever and simply rides up when struck from below by shade rail (116a) when the shade is moving to an "up" position (window open). When the shade moves to a "down" position (window closed), floater rail (159) drops until the cable is taut.

FIGS. 11A, 11B, and 11C illustrate further details. It is seen that standoffs may be used to help shade spacing and that, optionally, hinges (163) may be used to allow shades to pivot with respect to the shade rails.

With reference to FIG. 12, an electric motor (158), powered by the aircraft electrical system and controlled through the use of a switch (not shown) known in the art, which switch is accessible to the passenger of the aircraft, is utilized to provide energy to raise and lower the shade rails. More specifically, motor (158) drives a pair of lead screws (160a) and (160b). It is noted that these two lead screws are threaded in opposite directions; for example, lead screw (160a) having a left-hand drive and lead screw (160b) having a right-hand drive, the two lead screws are coupled through the use of a connector (163). The lead screws engage first ends (124a) and (126a) of levers (124) and (126) through the use of rifled couplers (162) such that, when the lead screws are energized, the couplers transmit the rotational motion to translational motion along the axis of the lead screws and move the first ends of levers (124) and (126) together or apart along such axis. It is seen that a series of brackets (164) is provided for mounting the lead screw to the frame near the upper edge thereof. Limit switch (165) is provided to de-energize electric motor (158) when struck by the upper edge of the uppermost rail (the floater rail, if one is used).

The above description sets forth the details of the mechanical components of Applicant's present invention. More specifically, it illustrates the use of an electric motor to energize a series of shade rails through the use of a pair of levers operating off a motor-driven lead screw or other mechanical means to drive one end of the lever pair to raise or lower the window shade. The window shade itself is a series of discrete panels mounted on shade rails which, in turn, engage the levers, causing the panels to be raised and lowered in unison. Further, Applicant provides a means to maintain alignment of the window rail during the raising and lowering process.

FIGS. 13–17 illustrate an alternate preferred embodiment of applicant's present invention which will help provide for manually raising and lowering aircraft window (10a). Much of the structure of the manual window is similar to the embodiments represented in FIGS. 9–12. More particularly, aircraft window (10a) is comprised of a rectangular frame or body (12) including side members, tracks, or rails (114a) and (114b); shade rails (116a), (116b), (116c), and (116d) (typically four but, optionally, more or less), the shade rails having removed ends (118a), (118b), (118c), and (118d) (on either side) and bodies (120a), (120b), (120c), and (120d) (between the two ends).

Vertical movement of the lowest shade rail, here shade rail (120d), will be transmitted to the remaining shade rails through the pair of scissored levers (122) which includes a first lever (124) having a first end (124a) and a second end (124b) with a body (124c) therebetween and a second lever (126) having a first end (126a), a second end (126b), and a body (126c) therebetween.

Figure 13:
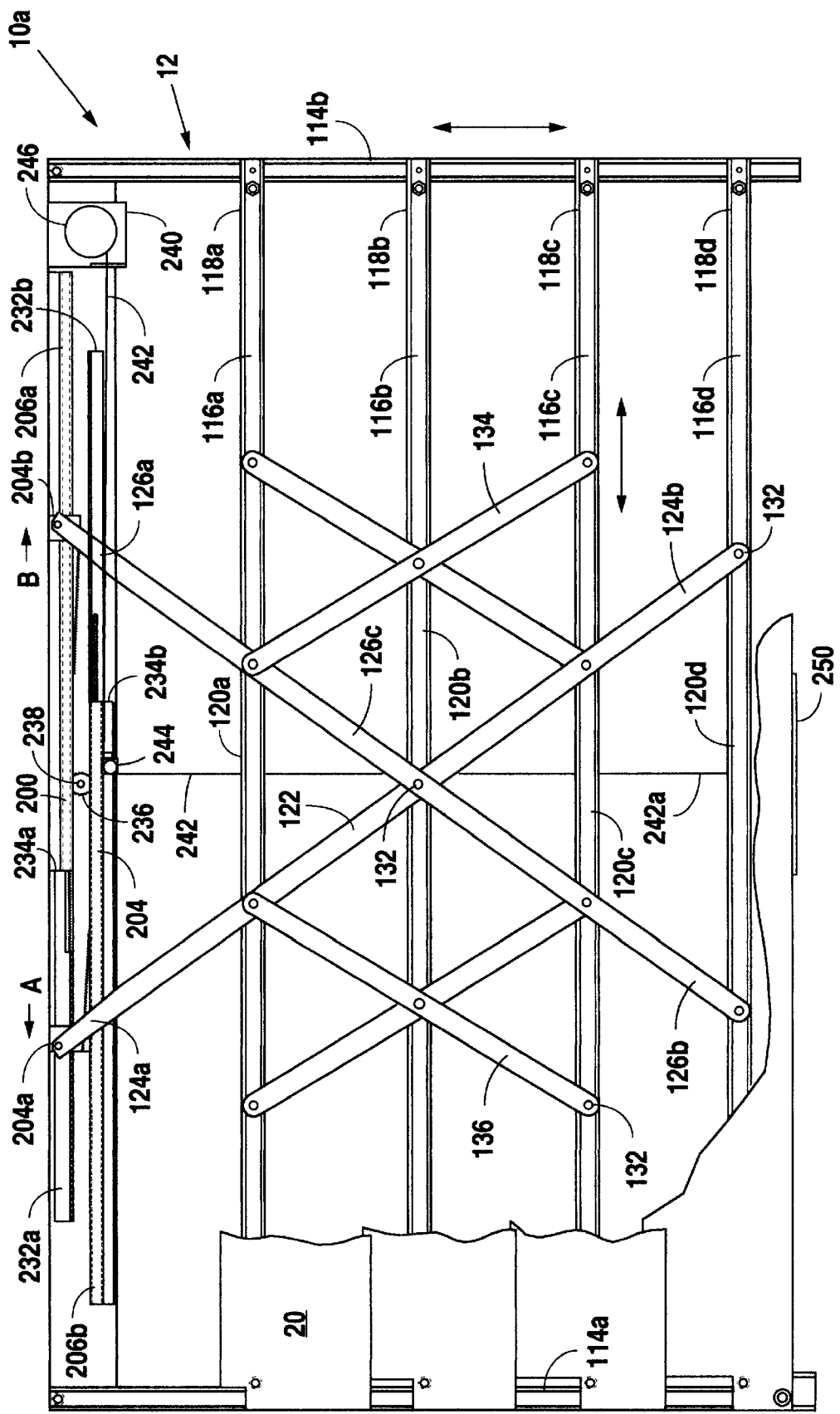
FIG. 13 is a front elevational view with the shade cut away to reveal the mechanism for raising and lowering the shade of the aircraft window.

Again, as set forth in FIGS. 9 and 13, Applicant's manual "roman shade" window uses a first pair of alignment levers (134) and a second pair of alignment levers (136) to assist in the smooth operation, alignment, and separation of the shade rails as they move between an open (raised) and closed (lowered) position.

Additional details of Applicant's manual window may be appreciated with reference to FIGS. 13 and 14. Specifically, it is seen that Applicant provides a coupling means (200) to coordinate and engage the two lever ends such that the levers of the pair of scissored levers (122) move with each other at the first ends (124a) and (126a) thereof when a force with a vertical component thereto is applied at a handle (250) (or any shade rail), which handle is typically mounted to the lowest shade rail, here (116d), at a point midway between the removed ends (118d) of the shade rail. Coupling equalizes lateral forces at the lever ends to help aid alignment of the shade as it is raised and lowered.

Figure 15A:
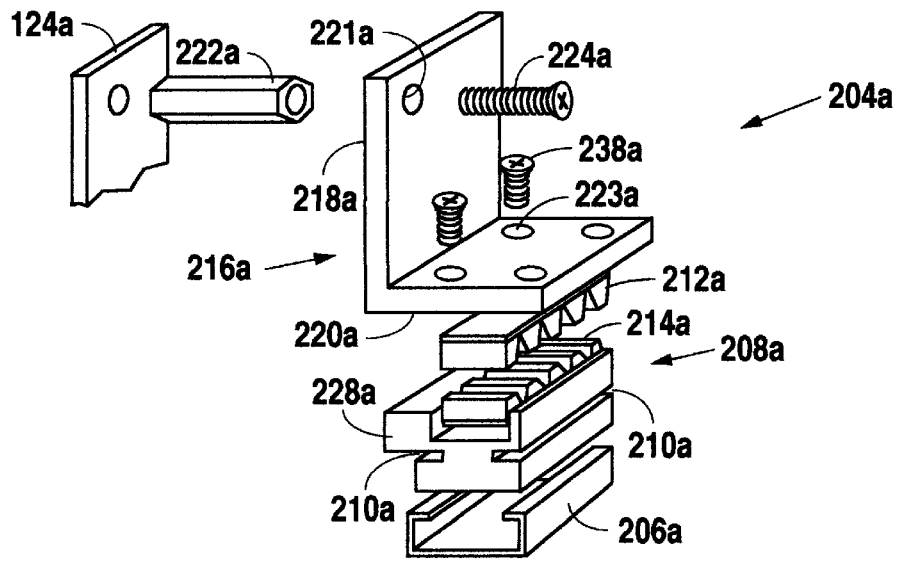
FIG. 15A is a perspective view of the first track mechanism of Applicant's present invention removed from the window shade assembly.
Figure 15B:
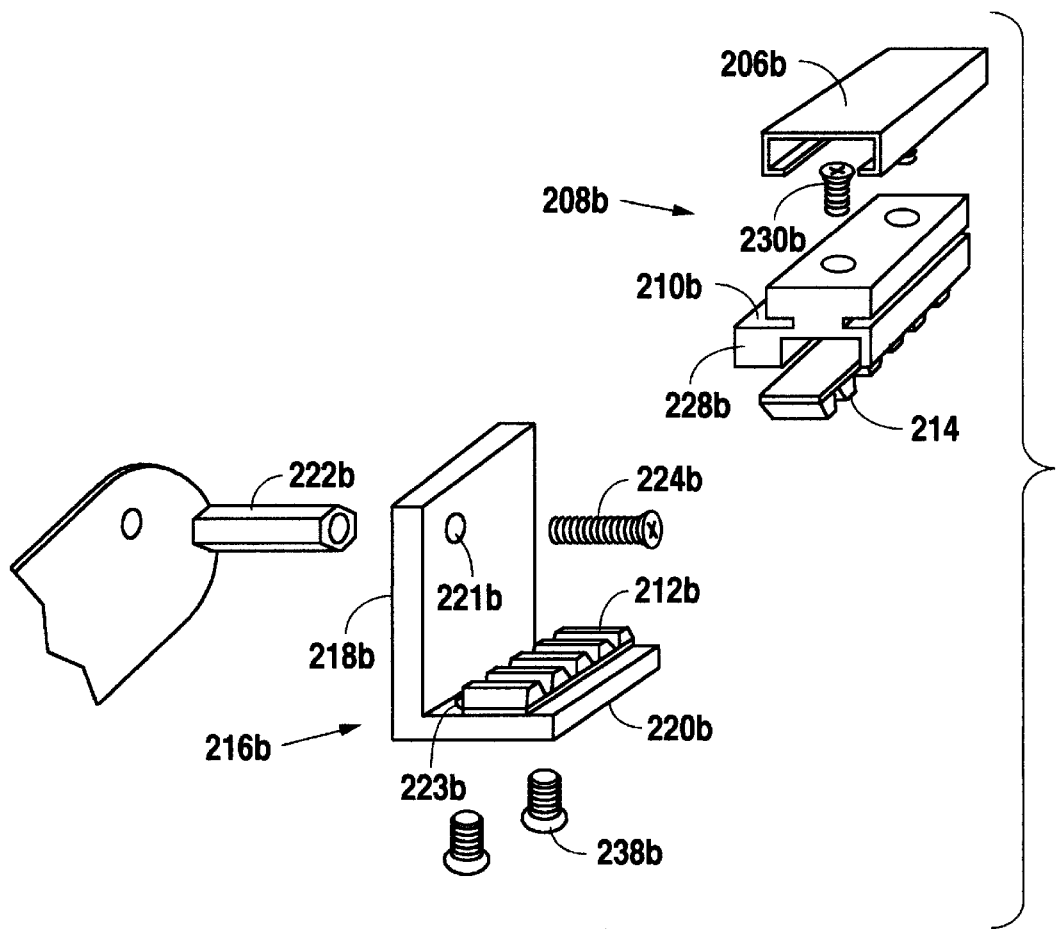
FIG. 15B is a perspective view of the second track mechanism of Applicant's present invention removed from the window shade assembly

The coupling function of coupling means (200) is accomplished through the use of the elements set forth in FIGS. 13 and 15A and 15B, more specifically, through the use of a pair of track mechanisms, including first track mechanism (204a) and second track mechanism (204b) and the rack and pinion mechanism (205) located between the two track mechanisms.

Turning now to FIGS. 13, 15A, and 15B, it is seen how first track mechanism (204a) is comprised of an elongated C-shaped guide channel (206a), typically an aluminum extrusion rigidly mounted to the frame, parallel to the shade rails. Slideably captured on the guide channel is a nylon slider (208a) with walls defining notches (210a) which notches slideably engage the "feet" of the C-shaped guide channel (206a). First track mechanism (204a) also includes locking track (212a) and drive track (214a) which meshably engage one another through the use of engagement bracket (216a) as set forth in more detail below. It is seen that engagement bracket (216a) has a leg portion (218a) and a foot portion (220a), these two portions being set perpendicular to one another. Further, the leg portion is seen to include walls defining hole (221a) (typically one hole) and the foot portion is seen to include wall defining holes (223a) (typically two holes). Further, it is seen that track mechanism (204a) has a spacer (222a) that mounts end (124a) of first lever (124) to the upper portion of leg (218a) of engagement bracket (216) with a fastener (224a) located in hole (221a). It is seen that locking track (212a) is fastened to foot portion (220a) through the use of locking track fasteners (not shown) (typically two fasteners). Fasteners (238a), when inserted through the holes (223a) and into boss (228), then tightened, "sandwich" drive track (214a) into meshing with locking track (212a). This is done during assembly to adjust the two lever ends with respect to the passive gear, so they are equal distanced outboard therefrom. The drive track may be fastened to the slider by any suitable fastener means (see FIG. 15, for example fasteners 230b).

Understanding the structure set forth in the paragraph above will help understand similarly constructed second track mechanism (204b) which includes, like the structure set forth above: an elongated second C-shaped guide channel (206b) which, like the first guide channel, is typically an aluminum extrusion mounted to the top frame member parallel to the shade rails; a second nylon slider (208b) having notches (210b); a second locking track (212b) and second drive track (214b); a second engagement bracket (216b) with leg portion (218b) and foot portion (220b) as well as holes (221b) and (223b); spacer (222b) and fasteners (224b), and (238b).

The function of these two track mechanisms is to lock the two ends of the levers fixedly to the drive track and slideably to the guide channels so the lever ends will slide laterally when a vertical force is applied to a shade rail. This is accomplished by fastening the locking lever ends (through the use of engagement brackets, fasteners and standoffs) to the nylon sliders and the channel guides. The slider is slideably engaged to the respective guide channel and located (in a manner set forth below) with respect to the combined engagement member, spacer, and lever end adjacent the drive track.

Fasteners are used to secure the foot of the engagement bracket snugly against the nylon slider, trapping or "sandwiching" the drive track with the locking track. In other words, through the use of the fasteners which go through the foot of the engagement bracket and into the nylon slider, there is a forced meshing engagement of the drive track with the locking track, which locking track is fixed to the nylon sliders which, in turn, ride in the guide channels, the guide channels being mounted parallel to each other in the manner set forth in FIG. 13.

Turning now to FIG. 13, it is seen that two track support angles (232a) and (232b) are placed adjacent the ends (234a) and (234b) of the two guide channels. Finally, it is seen that there is a passive gear (236) laterally located midway between side rails (114a) and (114b), vertically located, midway between the two spaced-apart guide channels, and typically mounted so as to rotate on an axle (238) which, in turn, is mounted through a suitable engagement member (not shown) or directly to the top frame member.

With the understanding of the above structure, it may be appreciated how a force with a vertical component applied to handle (250) or to any shade rail is converted to a lateral force, imparting a translational motion to the lever ends along the axes defined by guide channels (206a) and (206b). That is, the vertical force applied to the handle as indicated at (F) in FIG. 13 will result in sliding forces indicated by arrows (A) and (B) in FIG. 13, which will be coupled through the use of the two track mechanisms with their respective drive tracks (214a) and (214b) which engage passive gear (236), one near the top of the passive gear and one near the bottom, to coordinate and equalize the lever ends lateral sliding movement.

Figure 16:
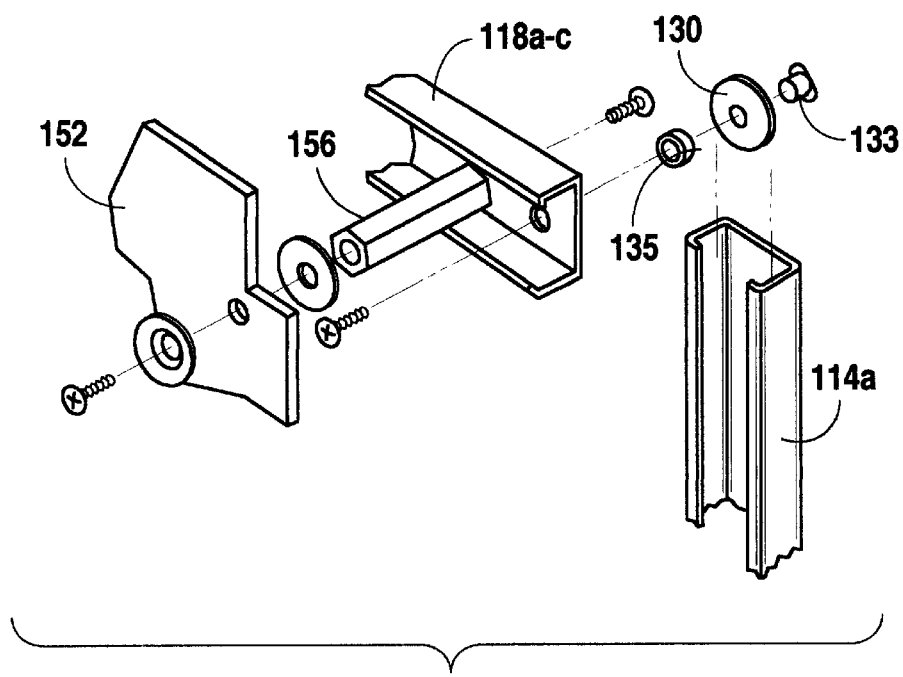
FIG. 16 is a perspective, exploded view of the side frame rail and shade rail assembly detail of Applicant's present invention removed from the window shade.

FIG. 16 illustrates details of the manner in which the shade rails join the side frame member and in which the shade rails join the shade panel (152). More specifically, it is seen that a spacer is provided to allow the shade panel to stand off or away from the cross-bar rail. Spacer (156) may be adjusted in width to provide for the desired contour of the shaped panel. (see FIG. 14) Appropriate fasteners, washers and the like are used to fasten the spacer between the shade panel and the shade rail, typically inboard of the point where the shade rail connects the side frame member. The side frame member is slideably connected to the cross-bar rails through the use of a disk-shaped nylon washer or slider (130) and any nylon spacers (135) as needed. Standoff (133) may also be needed and used as appropriate.

Figure 17:
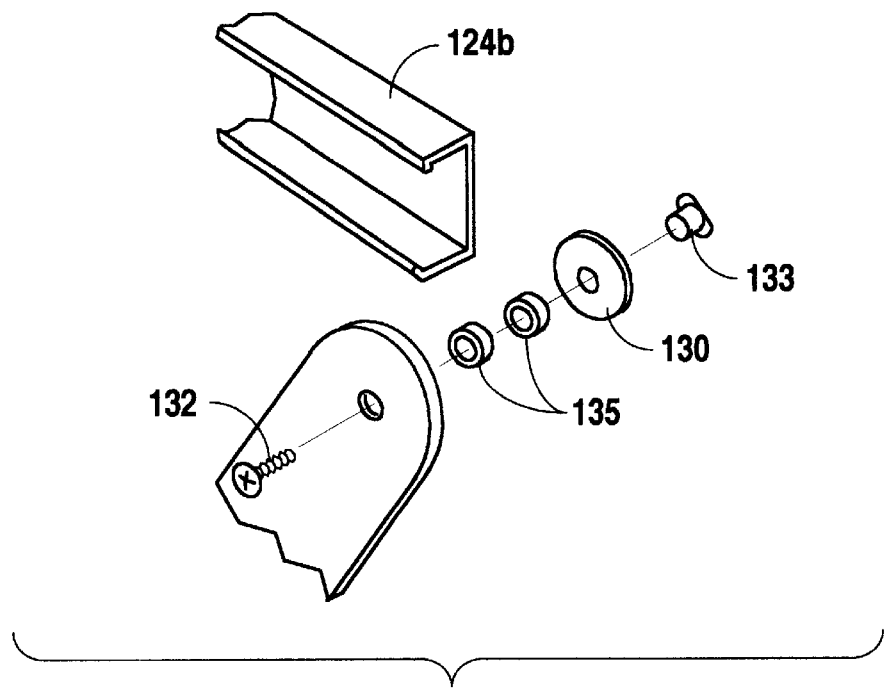
FIG. 17 is a perspective, exploded view of the sliding arm assembly to shade rail detail of Applicant's present invention as removed therefrom.
Figure 18A:
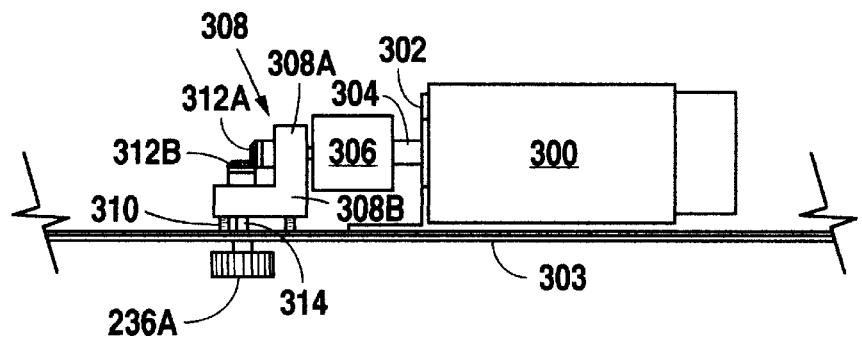
FIGS. 18a, 18b and 18c are side elevational, front elevational and end elevational views of a motor for use with Applicant's present invention.
Figure 18B:
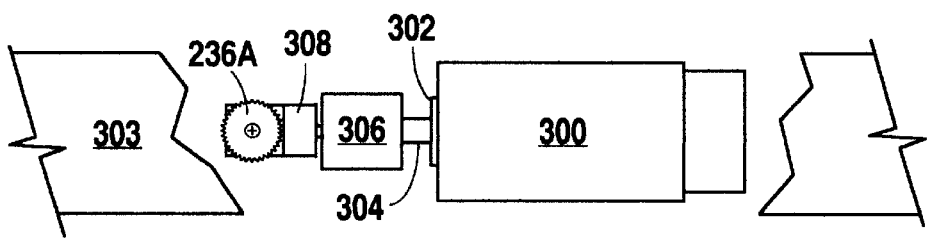
Figure 18C:
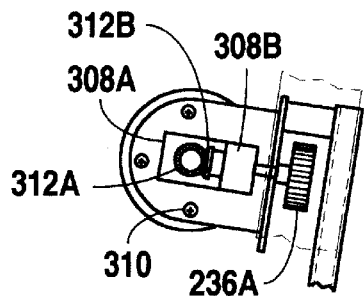

FIG. 17 illustrates details of the manner in which the end of a lever slideably joins a shade rail. As can be seen in FIG. 17, the end of a lever has a hole in it. Through the hole pin (132) or other fastener is typically joined by or with a standoff (133) which will securely hold nylon slider (130) along with any nylon spacers (135) (as needed). Slider (130) is typically disk-shaped with a diameter sufficient to engage the top and bottom walls of the shade rail but is larger than the distance between the two "feet" on the shade rail. In this manner, the slider slides within the shade rail driven by the end of the lever.

Turning back to FIG. 13, additional details of applicant's coupling means may be appreciated; more specifically, the rack and pinion mechanism (205). Drive tracks (214a) and (214b) extend from their respective track mechanisms laterally toward and past passive gear (236), one above and one below. The two drive tracks are dimensioned to fit within the opening between the arms of the guide channels. The two guide channels extend one above and one below passive gear (236) with their openings facing one another (the bottom guide channel (206b) facing up and the top guide channel (206a) facing down). The two guide channels are located such that an arc along the top and an arc along the bottom of the passive gear extends between and through the arms of the guide channel with the passive gear's teeth against and meshing with the teeth of the two drive tracks, trapping the drive tracks between the transverse portion of the guide channels and the teeth of the passive gear so the drive tracks do not "jump" out of engagement with the teeth of the passive gear. In this manner, movement of one end of the levers is transmitted or coupled with the other, through the passive gear.

Extending beyond distal ends of the guide channels are drive track support angles (232a) and (232b). Drive track support angle (232a) will provide a ledge upon which drive track (214b) may ride as it comes out of guide channel (206a) while drive track support angle (232b) provides a roof against drive track (214a) as it comes out of guide channel (206a) to prevent binding up or interference of the drive tracks with other elements of the mechanism. The drive track support angles are seen to be similarly dimensioned and fastened with a base portion against a frame member or supported adjacent a frame member and legs extending perpendicularly therefrom.

Another functional device is provided in applicant's present invention, namely, a lift assist means to assist the raising of the shade from a lower position to a higher position as seen in FIG. 13. Lift assist means (240) includes a cable (242) having a first end (242a) and a second end (242b). The first end of cable (242) is attached to the lowest shade rail adjacent handle (250). The handle is typically located on the lowermost shade rail and is comprised of an L-shaped member with the vertical portion attached to either a shade segment or the shade rail and the horizontal portion projecting out for the user to grasp and apply a vertical force to open (raise) and close (lower) the shade.

From there, the cable extends upward to pulley (244), which pulley is anchored to a frame member or a support which, in turn, is mounted to the frame. The pulley provides a change of direction to the cable, approximately 90°, allowing the cable to run parallel to the shade rails along the top of the window and over to a spring-powered reel (246), such as one available from Sterling Instrument, Inc. The spring-powered reel is attached to the frame and has sufficient power to provide tension in cable (242) to assist the user in raising the shade.

FIGS. 18a through c and FIG. 19 all illustrate an alternate preferred embodiment with an electric motor (300) used to drive a powered gear (236a) reversibly which in turn will drive the drive tracks and track mechanisms operating the scissored levers on which the shade rails and shade panels hide. The electric motor is mounted to the rear or backside of the frame or reveal using an "L-shaped" motor mount (302) which attached with fasteners (310) (see FIG. 18*c*) to the face of the electric motor and has a foot portion which attaches to a unit mount (303), the unit mount then typically attaching to the rear of the frame or reveal or other support member positioned such that it can drive the powered gear (236*a*), which is located in the same position as passive gear (236).

Electric motor (300) has an electric-motored drive shaft (304) projected therefrom which attached either directly to or through a coupling (306) to beveled gear (motor) (312*a*). Beveled gear (312*b*), which is dimensioned to mesh with beveled gear 312*a*, is attached to powered gear drive shaft (314), the end of which projects through unit mount (312) through the other reveal or other mounting structure and carries to the end thereof powered gear (236*a*). It is seen with reference to FIGS. 18*a* through 18*c*, beveled gear drive adaptor (308) is used to locate and support the electric motor drive shaft (304) and powered gear drive shaft (314) in perpendicular arrangement such that the two beveled gear mesh. More specifically, it is seen that drive adaptor (308) has a leg portion (308*a*) and a foot portion (308*b*), the two portions integral and perpendicular one to the other. In the leg portion (308*a*) is an appropriate hole with a bearing surface to locate the electric motor drive shaft. In the foot portion (308*b*), there is also a hole or shaft with an appropriate bearing surface to locate the powered gear shaft (314). The drive adaptor (308) is fastened to unit mount (303) with suitable fasteners, adhesive or any other appropriate way.

Mounting on the electric motor is effected by mounting all the elements to the unit motor mount with the exception of the powered gear. The unit motor mount is then attached, with appropriate fasteners, to the backside of the reveal of the rear member, frame member or combination of these elements, adjacent a hole through which powered gear drive shaft is located.

The electric motor is typically powered from the aircraft's electrical system and controlled by the window operator through switches known in the trade [limit switches?].

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. An aircraft window comprising:
    a generally rectangular frame having a top member and a bottom member and two side members;
    a multiplicity of shade rails, said multiplicity of shade rails including a lowermost shade rail mounted transversely between the two side members;
    a shade having a multiplicity of discrete, flat laying shade segments, each shade segment engaging one of said multiplicity of shade rails, each of the multiplicity of shade segments with a top horizontal edge and a bottom horizontal edge;
    means for slideably engaging the shade rails to the side members of the frame;
    a handle cooperating with at least one of the multiplicity of shade rails for moving the shade rails between a raised and a lowered position, said raised position with the shade rails adjacent one another near the top rail of said frame and with the shade segments stacked in overlapping fashion, said lowered position with the shade rails generally equidistant apart and equally spaced between the top and the bottom members of said frame and with the shade segments top horizontal edge laying generally adjacent the bottom horizontal edge of the shade segment above it, so as to substantially prevent light from passing through the window; and
    means for engaging the multiplicity of shade rails such that vertical movement of one of the shade rails between the raised and the lowered position will cause the other of the multiplicity of shade rails to move likewise.

2. The device of claim 1, wherein the means for engaging further includes a pair of scissored levers with each lever of the pair having a first end and a second end, the pair of scissored levers including means for slideably engaging at least one of the multiplicity of shade rails at a first end thereof.

3. The device of claim 2, wherein the handle engages the lowermost shade rail for manually moving the shade rails between the raised and the lowered position.

4. The device of claim 3, wherein the pair of scissored levers includes, at the second end thereof, means cooperating therewith to equalize lateral forces between the second ends of the levers of the second lever pair as the shade rails move between the raised and the lowered position in response to a vertical force on a shade rail.

5. The device of claim 4, wherein means to equalize includes a rack and pinion mechanism.

6. The device of claim 1 further including separation maintenance means to maintain separation of the shade segments as the shade rails move between the raised and the lowered position.

7. The device of claim 6, wherein separation maintenance means further includes a second lever pair and a third lever pair, said second and third lever pairs cooperating with said multiplicity of shade rails to maintain equalized separation of the shade rails as the shade rails move between an open and a closed position.

8. The device of claim 2 further including means for slideably engaging the first ends of the scissored levers to the top member of the frame.

9. The device of claim 8, wherein the means for slideably engaging includes a guide channel and a slider, the guide channel attached to the top member and the slider attached to a bracket, the bracket, in turn, mounted to the first end of each lever of said scissored levers.

10. The device of claim 1 further including means to assist movement of the shade between the lower and the upper position.

11. The device of claim 10, wherein the means to assist includes a cable with one end attached to a shade rail and a second end attached to a spring-powered reel, the reel providing tension in the cable to assist the movement of the shade rail from the lower position to the upper position.

12. The device of claim 1 further including means to space the shade segments away from the shade rails.

13. The device of claim 5, wherein the rack and pinion mechanism includes a passive gear mounted to the frame and a pair of drive tracks, each one of the pair attached to the first end of the first scissored levers, the drive track engaging the passive gear such that, when a first end of the scissored lever moves, the drive track engaged with such first end will move the passive gear so as to impart motion to the other of the drive tracks and the other of the first ends.

14. In an aircraft window having a shade comprising a multiplicity of shade segments and a rectangular frame with a top member, a bottom member, and two side members, and a multiplicity of shade rails, including a lowermost shade rail and an uppermost shade rail, with the shade rails slideably joining the side members of the frame in general perpendicular engagement therewith, each of the multiplicity of shade rails having one of the shade segments thereon, means for moving the shade between an open and a closed position, the open position for allowing light to pass therethrough and the closed position for obstructing the passage of light therethrough, the means for moving including: a first pair of scissored levers, each lever of said pair having a first end and a second end and a body portion therebetween, said first end and said body portion including means cooperating with said shade rails to slideably engage each of the levers to each of the first pair of shade rails.

15. The device of claim 14 further comprising means cooperating with the top member and the first ends of said first pair of scissored levers for slideably engaging the first ends to the top member while equalizing lateral forces on the first ends thereof such that, when the scissored levers are moved between a collapsed and an expanded position in response to forces on the levers, the shade rails maintain a general perpendicular alignment with the side members and maintain a generally equal distance spacing with adjacent shade rails.

16. The device of claim 15 further including a handle engaging the lowermost shade rail for manually raising and lowering the shade rails to move the shade between an open and a closed position.

17. The device of claim 16 further including means to assist the manual movement of the handle toward a closed position.

18. The device of claim 16 further including a second and a third pair of sliding levers, located adjacent said first pair and including means for slideably engaging the shade rails.

19. The device of claim 17 wherein said means to assist includes a cable with a first end and a second end, the first end attached to the lowermost shade rail and the second end attached to a spring-powered reel, the spring-powered reel biased to wind in the cable during manual raising of the handle.

20. In an aircraft window having a shade comprising a multiplicity of shade segments and a rectangular frame with a top member, a bottom member, and two side members, and a multiplicity of shade rails including a lowermost shade rail and an uppermost shade rail slideably joining the side members and perpendicular thereto each of the multiplicity of shade rails having one of the shade segments thereon, means for moving the shade rails between an open position, the open position for allowing light to pass therethrough and a closed position for obstructing the passage of light therethrough, the means for moving including a first pair of scissored levers, each lever of said pair having a first end and a second end and a body portion therebetween;

said first end and said body portion including means cooperating to slideably engage each of the levers to each of the first pair of shade rails, means cooperating with the top member of the frame and the first ends of said first pair of scissored levers for slideably engaging the first ends to the top member while equalizing lateral forces on the first ends thereof such that when the scissored levers are moved between a collapsed and an expanded position in response to lateral forces on the levers thereof the shade rails maintain a general perpendicular alignment with the side members and equidistant spacing with adjacent shade rails.

21. The window of claim 20 further including a handle engaging the lowermost shade rail for manually raising and lowering the shade between an open and a closed position.

22. The window of claim 21 further including means to assist the manual movement of the handle towards a closed position.

23. The window of claim 21 further including a second and a third pair of scissored levers adjacent said second and third pairs of scissored levers including means for slideably engaging the shade rails.

24. The device of claim 20 further including a handle engaging the lowermost shade rail for manually raising and lowering the shade between an open and a closed position, means to assist the manual movement of the handle towards a closed position, and including a second and a third pair of scissored levers adjacent said second and third pair of scissored levers including means for slideably engaging the shade rails.

25. The window of claim 24 wherein said means to assist includes a cable with a first and a second end, the first end attached to the lowermost shade rail and the second end attached to a spring-powered reel, biased to wind the cable thereon during manual raising of the handle.

\* \* \* \* \*